No. 720,730. PATENTED FEB. 17, 1903.
J. W. NEWALL.
LIMIT GAGE.
APPLICATION FILED JAN. 27, 1902.
NO MODEL. 2 SHEETS—SHEET 1.
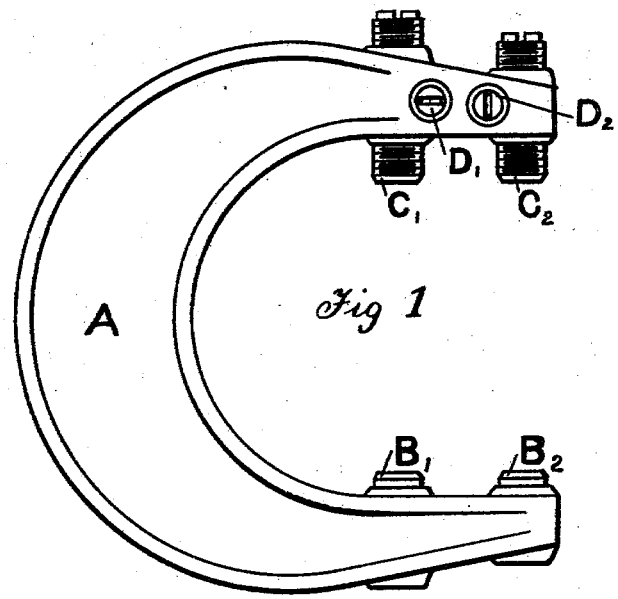
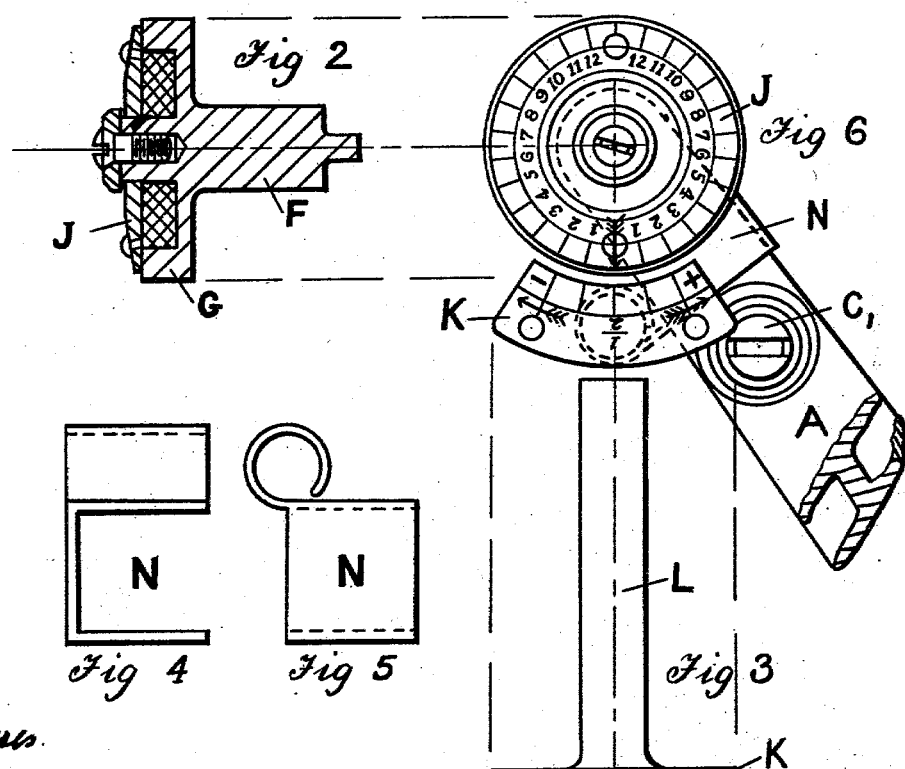

No. 720,730. PATENTED FEB. 17, 1903.
J. W. NEWALL.
LIMIT GAGE.
APPLICATION FILED JAN. 27, 1902.
NO MODEL. 2 SHEETS—SHEET 2.
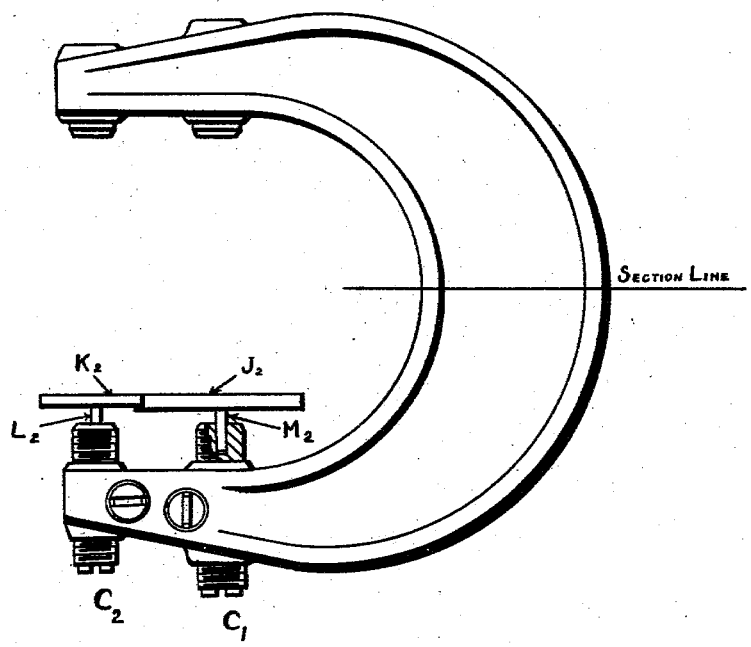
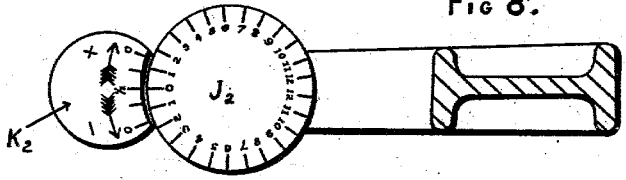

UNITED STATES PATENT OFFICE.

JOHN W. NEWALL, OF ONGAR, ENGLAND.

LIMIT-GAGE.

SPECIFICATION forming part of Letters Patent No. 720,730, dated February 17, 1903.

Application filed January 27, 1902. Serial No. 91,370. (No model.)

*To all whom it may concern:*

Be it known that I, JOHN W. NEWALL, a subject of the King of Great Britain, residing at Forest Hall, Ongar, in the county of Essex, England, have invented a new Limit-Gage, (for which I have applied for a patent in England,) of which the following is a specification.

My invention relates to limit-gages for testing the outside dimensions of work. Hitherto they have usually been formed from the solid, usually with a gage at each end of a bar, and usually also a separate gage is required for each size which has to be tested. I form them of a crescent or other convenient shape, which provides two horns to carry two pairs of measuring-points side by side, so that one movement of the hand tests both limits, and one point of each pair is formed as a screw, so that one gage-body can be adjusted to test several sizes and for wear. To set them for any size required, the screwed ends may be adjusted to a standard inside gage, and then the allowance for limit in each direction may be given by a partial turn of each screw, for which purpose the screws must be provided with some kind of index, permanently or temporarily attached, or special limit-gages may be made for the limits required and the calipers set to those gages. In that case no index is required. In order to avoid the expense of making an index to each screw and also the inconvenience of having two such projections permanently attached to each gage, I use a loose dial and index plate which can be applied to any gage of the series which has to be adjusted.

In the drawings, Figure 1 shows a gage made according to my invention. Fig. 2 shows a screw-driver with dial-plate attached. Fig. 3 shows an index-plate. Figs. 4 and 5 show two views of the spring-clip. Fig. 6 shows a screw-driver, dial and index plate temporarily attached to a gage; and Figs. 7 and 8 show side and half-plan views of a gage with dial and index plates temporarily attached to the screws by means of small shanks, which fit into holes in the ends of the screws.

A is a crescent-shaped frame.

$B'$ $B^2$ are two fixed points or anvils.

$C'$ $C^2$ are two screwed points exactly in line with $B'$ $B^2$. The faces of B and C are made exactly at right angles with their axes, and therefore they come exactly parallel with one another.

$D'$ $D^2$ are two locking-plugs for fixing $C'$ $C^2$ rigid after they have been adjusted to size. Any other convenient form of locking arrangement may be used.

F is a short screw-driver with a flat round head G knurled on the edge.

J is a dial-plate so divided as to indicate the amount moved by the screw. It is preferable to have the dial-plate separate from the screw-driver head, (but pressed to it by light spring-friction,) so that the zero of the dial-plate can be readily set to the zero of the index-plate; but the graduations may be made directly on the plate G.

K is an index-plate with a shank L, which is held when in use by the spring-clip N or other suitable means.

To use the attachment, the clip N is pressed onto the frame of the gage in such a position that when the shank of the index-plate is put into the socket and the screw-driver applied to the nick in the head of the screw the edges of the dial-plate and index-plate almost touch. Then if the two zeros be brought to coincide the amount which the screw has to be moved can be read off directly. If very exact adjustments are needed, the index-plate can be graduated to serve as a vernier, with which it is quite easy to read to .0001''. Another arrangement is to attach the dial to the point of the screw and then use an ordinary screw-driver to set with. The dial-plate may be temporarily attached to the screw-point by friction, vacuum, or magnetism or other suitable means.

It is not necessary that the measuring-points be always side by side, though it is generally most convenient.

In Figs. 7 and 8, $K^2$ $J^2$ represent a dial and index plate having on the under side of them small shanks $L^2$ $M^2$, which are preferably made taper and which fit into holes prepared for them in the ends of the screws $C'$ $C^2$. In this case the shanks are pressed into the holes in the screws when adjustment is to be made and removed when that operation is finished.

What I claim as my invention, and desire to secure by Letters Patent, is—

An adjustable limit-caliper for outside gaging formed with two pairs of measuring-points, one of each pair being adjustable, and means for locking the adjustable points, in combination with means for adjustment consisting of a turn-screw, a dial-disk and an index-disk, separate from the gage but capable of being temporarily attached thereto by simple pressure for the purpose of adjustment, all substantially as illustrated and described.

JNO. W. NEWALL.

Witnesses:
L. ROBERTSON,
HARRY F. ATKINS.